United States Patent [19]

Bowsky et al.

[11] Patent Number: 4,580,003
[45] Date of Patent: Apr. 1, 1986

[54] HERMETIC TERMINAL ASSEMBLY

[75] Inventors: Benjamin Bowsky; Glenn A. Honkomp, both of Warren County; Larry G. Burrows, Hamilton County, all of Ohio

[73] Assignee: Emerson Electric Co., St. Louis, Mo.

[21] Appl. No.: 732,721

[22] Filed: May 10, 1985

Related U.S. Application Data

[63] Continuation-in-part of Ser. No. 669,249, Dec. 3, 1984.

[51] Int. Cl.⁴ .................... H01B 17/30; H01R 13/74
[52] U.S. Cl. .................... 174/152 GM; 339/192 RL
[58] Field of Search .......... 174/152 GM; 339/192 RL

[56] References Cited

U.S. PATENT DOCUMENTS 4,296,275 10/1981 Bowsky ................. 174/152 GM
4,461,925 7/1984 Bowsky et al. .......... 174/152 GM

FOREIGN PATENT DOCUMENTS 0073731 3/1983 European Pat. Off. .... 174/152 GM

*Primary Examiner*—Laramie E. Askin
*Attorney, Agent, or Firm*—Polster, Polster and Lucchesi

[57] ABSTRACT

A hermetic terminal assembly wherein a radially extending flange on a current conducting pin that extends through a hole defined by a cover member adapted to be secured to an opening in a motor housing is surrounded by an electrically insulating sleeve with the inner axial extremity of the sleeve extending at an axial location relative the pin substantially beyond the inner face of the radially extending flange to provide an extended tortuous path between the flange on the pin and the cover member, the pin having an aperture extending therein on the inner end thereof within the compass of the sleeve, adjacent the inner face of the flange to provide a fuse-like area.

5 Claims, 6 Drawing Figures

HERMETIC TERMINAL ASSEMBLY

CROSS REFERENCE TO RELATED APPLICATION

This application is a continuation-in-part of Ser. No. 669,249, filed Dec. 3, 1984.

BACKGROUND OF THE INVENTION

The present invention relates to further variations in the construction of the hermetic terminal assemblies disclosed in U.S. Pat. No. 4,296,275, issued to Benjamin Bowsky on Oct. 20, 1981 and in U.S. Pat. No. 4,461,925, issued to Benjamin Bowsky and Glenn A. Honkomp on July 24, 1984.

In both U.S. Pat. Nos. 4,296,275 and 4,461,925, the inner end of the pin—that is the end of the pin on the dish side surface of the cup-shaped body—is provided with a radially extending flange of a major diameter larger than the diameter of the hole defined by an annular sealing lip, the flange being axially located relative the pin adjacent the inner extremity of an electrically insulating sleeve surrounding the pin in immediate or close proximity to such pin. In U.S. Pat. No. 4,461,925, the inner end of the pin is provided with a reduced neck, positioned axially relative the pin immediately adjacent the seal on the outside surface of the cup-shaped body to provide, in effect, a fuse-like area.

Some of the objects of this invention are to control the area of possible pin melting, prevent the pin from shorting to the housing shell, prevent the pin from leaving the housing shell, improve sealing and minimize leakage and provide maximum insulating surface between the pin and housing.

Another object is to provide a hermetic terminal assembly capable of obtaining these desirable features and yet which is straightforward, efficient and economical to manufacture and assemble, providing a terminal assembly which utilizes a minimum of materials and which is safer than many of the terminal assemblies known heretofore.

Still another object is to provide an alternate fuse-like area which utilizes a minimum of materials, which is straightforward, efficient and economical in manufacture and assembly, and which serves to confine the area of pin melting.

Various other objects will become obvious to one skilled in the art upon reading the disclosure set forth hereinafter.

SUMMARY OF THE INVENTION

In accordance with this invention, generally stated, a hermetic terminal assembly is provided, adapted to be secured to an opening in a motor unit housing, comprising: a cover member for such opening having at least one hole therein; a current conducting pin extending through the hole, the pin having an outer end to extend externally of the housing to receive an electrical connection to a current source and an inner end to extend within the housing to receive an electrical connection to a motor disposed in the housing, the inner end of the pin having a flange extending radially therefrom; a seal bonding the pin to the surface defining the cover member hole; and a hollow electrically insulating sleeve surrounding the pin and flange extending therefrom with the inner axial extremity of the sleeve extending at an axial location relative the pin substantially beyond the axial location of the inner face of the flange and the opposite axial extremity of the sleeve being bonded to the seal to provide an extended tortuous path between the flange on the pin and the cover member to minimize the possibilities of electrical arcing therebetween, the inner end of the pin having an aperture extending therein adjacent the inner face of the flange of the pin within the compass of the sleeve, to form, in effect, a fuse-like area. It is to be understood that various changes can be made in the general arrangement, materials and construction of the apparatus disclosed herein without departing from the scope or spirit of the present invention.

BRIEF DESCRIPTION OF THE DRAWINGS

Referring to the drawing which discloses one advantageous embodiment of the terminal assembly of this invention and a modified alternative pin arrangement therefor.

Figure 2:
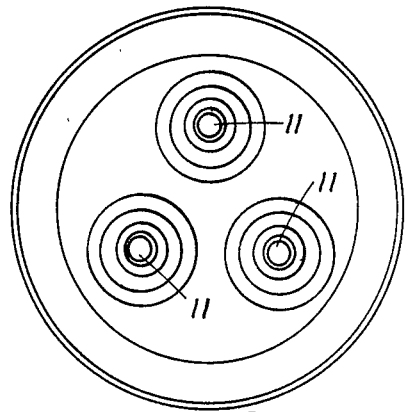
FIG. 2 is an end view of the assembly of FIG. 1 taken in a plane through line 2—2 of FIG. 1.
Figure 1:
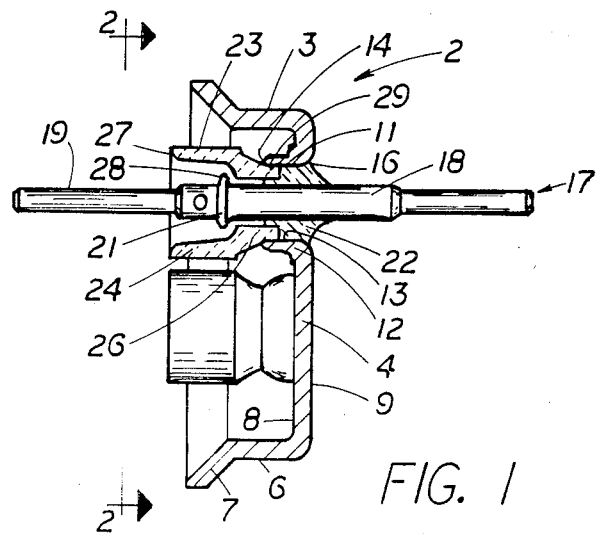
FIG. 1 is a view, partly in section and partly broken away, of the terminal assembly disclosing the novel sleeve and pin arrangement.
Figure 5:
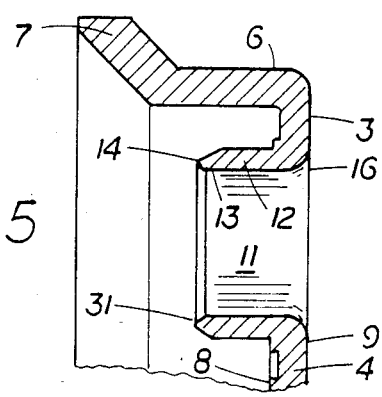
FIG. 5 is an enlarged cross-sectional view of a portion of the cup-shaped body of FIG. 1, disclosing in more detail the tapered inner wall extremity of the annular sealing lip; and, FIG. 6 is an enlarged cross-sectional view of the novel insulating sleeve disclosed in FIG. 1.

As can be seen in FIGS. 1 and 5, the hermetic terminal assembly of the present invention, broadly indicated by reference numeral 2, includes a cover member which in the drawing is shown as a cup-shaped body 3 having a generally flat bottom 4 and a sidewall 6 with an outwardly flaring rim 7. The flat bottom 4 has a dish or inner surface 8 and an outer or outside surface 9 and at least one hole or opening 11 defined by annular sealing lip 12 extending from inner surface 8 with an inside wall surface 13, a free inner extremity or edge 14 and a radius or outside edge 16. As can be seen in FIG. 2, cup-shaped body 3 is, in fact, provided with three such openings 11, all of which can incorporate similar annular sealing lip arrangements as described heretofore and similar pin and sleeve arrangements as described hereinafter.

As can again be seen in FIG. 1, extending through each hole 11 is a current conducting pin 17. Each pin 17 includes an outer end 18 which extends externally of cup-shaped body 3 and, of course, the motor unit housing having an opening in which the terminal assembly 2 is mounted (not illustrated herein). The outer end 18, the extremity of which can be stepped down, serves to be connected to a suitable electric current source (also not illustrated herein). Each pin 17 further includes an inner end 19 which extends beyond annular sealing lip 12, this inner end, which also can have a stepped-down extremity, serves to receive an electrical connection disposed in the motor unit housing to which assembly 2 is mounted. It is to be noted as shown in FIG. 3 that pin 17 can include an outer jacket 10 and an inner core 20, the core 20 being of a highly conductive material such as copper and the jacket being of a less conductive material, such as a steel alloy.

Figure 3:
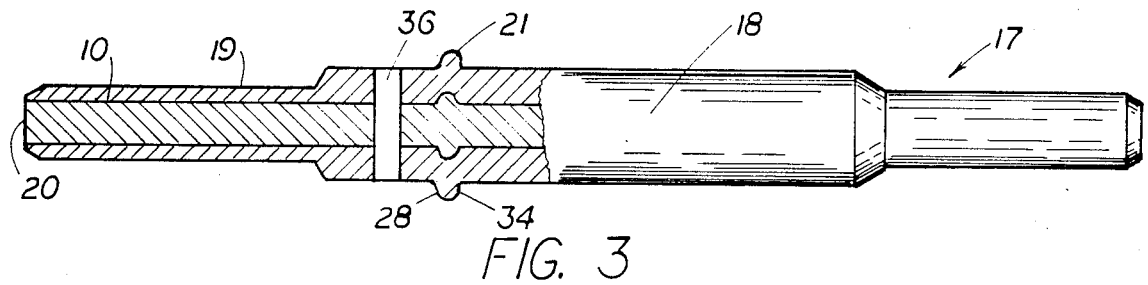
FIG. 3 is an enlarged view, partly in section, of the current conducting pin of FIG. 1.
Figure 4:
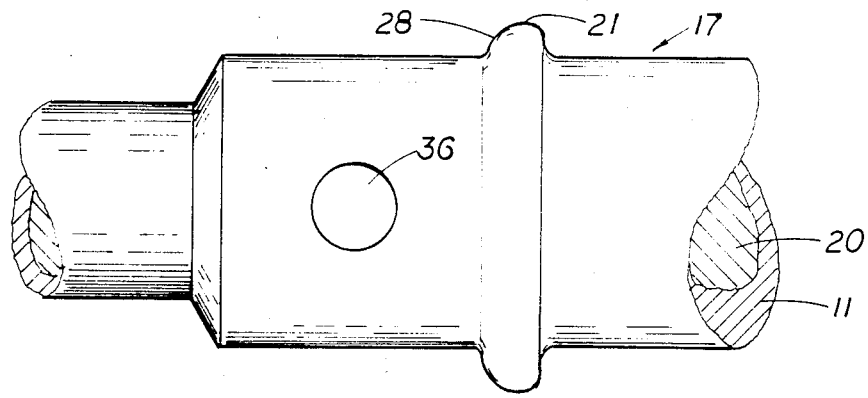
FIG. 4 is a further enlarged view of a portion of the conducting pin of FIG. 3.

As can be seen in FIGS. 1 and 3, inner end 19 of pin 17 includes a flange 21 formed from the outer jacket 10 and extending generally radially therefrom. It is to be noted that in the embodiment disclosed the diameter of flange 21 is less than the diameter of hole 11 defined by annular sealing lip 12. With such an arrangement of a small diameter flange it is possible to form the outer jacket 10 of pin 17 and flange 21 by a suitable forming process from corrosion resistent, stainless steel with a high chromium content, thus enhancing the bonding process of the pin in the glass seal, described hereinafter. Referring particularly to FIG. 1, it can be seen that when pin 17 is assembled with cup-shaped body 3, flange 21 is positioned in the embodiment disclosed at an axial location relative cup-shaped body 3 intermediate the inner extremity 14 of annular sealing lip 12 and the inner extremity of flaring rim 7 of cup-shaped body 3. To bond pin 17 in this selected position to the inner wall surface 13 of annular sealing lip 12, a glass seal 22 is provided, this glass seal, which is heat softened in an oven in the bonding process, also serves to receive and bond in place an extremity of hollow electrically insulating sleeve 23 which can be of a suitable ceramic such as alumina or steatite.

Figure 6:
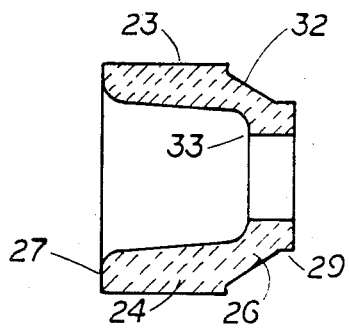

Referring to FIG. 6, it can be seen that ceramic sleeve 23 includes a hollow cylindrical body portion 24 and a truncated cone portion 26. As can be seen in FIG. 1, when the terminal is assembled, the cylindrical body portion 24 is sized to have an inner wall diameter larger than the diameter of hole 11 defined by annular sealing lip 12 to surround pin 17 and flange 21 radially extending from pin 17. It is to be noted that the inner axial extremity 27 of cylindrical body portion 24 extends at an axial location relative pin 17 substantially beyond the axial location of inner face 28 of flange 21. Thus, with this arangement of the terminal assemby 2, the tortuous distance of free travel from flange 21 to the inner edge 14 of annular sealing lip 12 would be along the inner and outer walls of cylindrical body portion 24 of sleeve 23 and a substantial portion of the outer wall of truncated cone portion 26, thus minimizing the possibilities of electrical arcing between flange 21, which, as aforenoted, is of reduced diameter, and annular sealing lip 12.

To enhance the assembly and bonding of ceramic sleeve 23 to glass seal 22 and annular lip 12, the extremity of truncated cone portion 26 of ceramic sleeve 23 is provided with a generally cylindrical extremity 29. The outer wall, diameter of cylindrical extremity 29 is sized to conform closely with and nest in hole 11 defined by annular sealing lip 12 and is of sufficient axial breadth to engage with and be bonded to glass seal 22 during the bonding process.

Referring particularly to FIGS. 1, 5 and 6, it is to be noted that the inner edge or extremity 14 of annular sealing lip 12 is tapered along the inner wall thereof, as indicated by reference numeral 31, to conform wih tapered outer wall 32 of truncated cone portion 26 of ceramic sleeve 23 which bears thereagainst. It further is to be noted that the inner wall of truncated portion 26 of sleeve 23 includes an inner annular ledge 33 which is of a diameter less than the diameter of flange 21. This ledge 33 serves to arrest flange 21 in the event of glass seal softening.

As can be seen in FIG. 1, in assembly, the opposite face 34 of flange 21 is axially spaced from annular ledge 33 a sufficient distance to accommodate for the different coefficients of expansion of the ceramic sleeve 23, the glass seal 22, the cup-shaped body 3 and the stainless steel pin 17. It is to be understood that the spacing would vary, depending upon the types of materials utilized for the aforedescribed parts.

Referring to FIGS. 1 and 3, it can be seen that the inner end 19 of pin 17 has a cylindrical aperture 36 adjacent to but spaced from inner face 28 of flange 21. Aperture 36 is arranged to extend axially through the longitudinal axis of the pin 17, the aperture being sized to be less in diameter and cross-sectional area than highly conductive core 20 to form, in effect, a fuse-like area well within the inner axial extremity 27 of insulating sleeve 23 so that if excessive heating of the pin occurs, the pin will melt in this area, the melting being contained by sleeve 23 away from flange 21 thereby protecting both the motor and persons in the vicinity. When this occurs, contained gas forces in the housing will likely cause opposite face 34 of flange 21 to abut against annular ledge 33 in truncated cone portion 26 of sleeve 23 to thus retain the outer end 18 of pin 17, transmitting the force through the conforming tapered outer wall 32 of truncated cone 26 and tapered extremity 31 along the inner wall of annular sealing lip 12.

Thus, from the above it can be seen that the present invention provides a further novel hermetic terminal assembly which can be readily manufactured and assembled to control the area of possible pin melting, to prevent the pin from shorting and leaving the housing shell and to improve sealing, providing maximum surface between pin and housing.

It is to be understood that various changes can be made in the embodiment disclosed without departing from the scope or spirit of the present invention. For example, it would be possible to provide a flat cover member without a rim 7 and/or an annular sealing lip 12, the cover member being of sufficient thickness to insure sealed bonding between the surface defining the cover member hole and the pin. It also would be possible to provide a cover member, flat or with a rim, with an annular sealing lip 12 which extends in an opposite direction from the lip as disclosed in the drawing—that is from outside wall surface 9.

We claim:

1. A hermetic terminal assembly adapted to be hermetically secured to an opening in a motor unit housing comprising: a cover member having at least one hole therein; a current conducting pin extending through said hole, said pin having an outer end to extend externally of said housing to receive an electrical connection to a current source and an inner end to extend within said housing to receive an electrical connection to a motor disposed in said housing, said inner end of said pin having a flange extending generally radially therefrom; said flange having an inner face facing said inner end of said pin, a seal bonding said pin to the inside surface defining said cover member hole; and a hollow electrically insulating sleeve surrounding said pin and said flange extending therefrom with the inner axial extremity of said sleeve extending at an axial location relative said pin substantially beyond the axial location of the inner face of said flange and the opposite axial extremity of said sleeve being bonded to said seal to provide an extended tortuous path between said flange on said pin and said cover member to minimize the possibility of electrical arcing therebetween, said inner end of said pin having an aperture extending therein spaced adjacent to the inner face of said flange to form, in effect, a fuse-like area.

2. The apparatus of claim 1, said aperture extending completely through said pin normal to the longitudinal axis of said pin.

3. The apparatus of claim 1, said inner axial extremity of said insulating sleeve extending at an axial location relative said pin substantially beyond the inner edge of said aperture.

4. The apparatus of claim 1, said pin having an inner core of highly conductive material and a surrounding outer jacket of less conductive material, said aperture having a breadth less than said inner core to permit current flow during normal operations.

5. The apparatus of claim 1, said aperture being in the shape of a cylinder extending completely through said pin with the longitudinal axis thereof normal to the longitudinal axis of said pin, said inner axial extremity of said insulating sleeve extending at an axial location relative said pin substantially beyond the inner edge of said cylindrical aperture, said pin having an inner core of copper and a surrounding steel jacket, said cylindrical aperture having a diameter less than the diameter of said copper core to permit current flow during normal operations.

* * * * *